(12) United States Patent
Vignal et al.

(10) Patent No.: US 11,336,223 B2
(45) Date of Patent: May 17, 2022

(54) ELECTRICAL CONNECTION DEVICE FOR A PHOTOVOLTAIC SYSTEM

(71) Applicant: ArcelorMittal, Luxembourg (LU)

(72) Inventors: Renaud Vignal, Sevrier (FR); Laurent Geron, Cerexhe-heuseux (BE)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 15/577,008

(22) PCT Filed: May 26, 2015

(86) PCT No.: PCT/IB2015/000755
§ 371 (c)(1),
(2) Date: Nov. 27, 2017

(87) PCT Pub. No.: WO2016/189343
PCT Pub. Date: Dec. 1, 2016

(65) Prior Publication Data
US 2018/0152136 A1    May 31, 2018

(51) Int. Cl.
*H02S 40/34* (2014.01)
*H02S 40/36* (2014.01)

(52) U.S. Cl.
CPC .............. *H02S 40/34* (2014.12); *H02S 40/36* (2014.12); *Y02B 10/10* (2013.01)

(58) Field of Classification Search
CPC .................................. H02S 40/34; H02S 40/36
(Continued)

(56) References Cited

U.S. PATENT DOCUMENTS

| 6,482,992 B2 | 11/2002 | Scholz et al. |
| 7,291,036 B1 | 11/2007 | Daily et al. |

(Continued)

FOREIGN PATENT DOCUMENTS

| CN | 101589476 A | 11/2009 |
| CN | 101922211 A | 12/2010 |

(Continued)

OTHER PUBLICATIONS

Corresponding International Search Report for PCT/IB2015/000755.

*Primary Examiner* — Dustin Q Dam
(74) *Attorney, Agent, or Firm* — Davidson, Davidson & Kappel, LLC

(57) ABSTRACT

The present invention provides a building exterior cladding. The panel includes an upper overlap area, a lower overlap area and a central part, covered by at least one photovoltaic module. A perforation is located in the lower overlap area and traversed by an electrical cable connecting one of two electrical poles of the photovoltaic module to an electrical plug located on the reverse side of the panel in the lower overlap area. An opening is located in the upper overlap area, into which is inserted an electrical junction box connected to another electrical pole of the photovoltaic module by an electrical cable. The junction box includes: a base, a lateral wall, including on its external surface, a peripheral shoulder to hold the box in place in the opening, an access door located on the lateral wall of the junction box, a cable outlet, an internal cavity delimited by the base and the wall, including an electrical terminal with an axis perpendicular to the base, and an electrical switch connecting the electrical terminal to the cable outlet and located facing the access door. The invention further provides an associated electrical junction box and the associated electrical connection assembly.

12 Claims, 6 Drawing Sheets

(58) Field of Classification Search
USPC .................................................. 136/243–265
See application file for complete search history.

(56) References Cited

U.S. PATENT DOCUMENTS

| | | | |
|---|---|---|---|
| 7,445,508 | B2 | 11/2008 | Daily et al. |
| 7,506,477 | B2 | 3/2009 | Flaherty |
| 7,824,189 | B1 | 10/2010 | Lauermann et al. |
| 7,884,278 | B2 | 2/2011 | Powell et al. |
| 8,341,900 | B2 | 1/2013 | Reyal et al. |
| 8,701,360 | B2 | 4/2014 | Ressler |
| 8,714,998 | B2 | 5/2014 | Jautard |
| 8,740,642 | B2 | 6/2014 | Keenihan et al. |
| 8,776,455 | B2 | 7/2014 | Azoulay |
| 8,853,520 | B2 | 10/2014 | Ueda et al. |
| 10,199,984 | B2 | 2/2019 | Shetty et al. |
| 2008/0110490 | A1 | 5/2008 | Duesterhoff et al. |
| 2008/0253092 | A1 | 10/2008 | Duesterhoff et al. |
| 2009/0114263 | A1* | 5/2009 | Powell ............. H01L 31/02021 136/244 |
| 2010/0018572 | A1 | 1/2010 | Grimberg et al. |
| 2010/0105245 | A1 | 4/2010 | Good et al. |
| 2012/0013191 | A1 | 1/2012 | Jeandeaud et al. |
| 2013/0146118 | A1 | 6/2013 | Kelley et al. |
| 2014/0293553 | A1 | 10/2014 | Stanelli et al. |
| 2015/0340990 | A1 | 11/2015 | Kim et al. |
| 2018/0152135 | A1 | 5/2018 | Vignal et al. |

FOREIGN PATENT DOCUMENTS

| | | | |
|---|---|---|---|
| CN | 102460731 | A | 5/2012 |
| CN | 102535769 | A | 7/2012 |
| EA | 200970984 | A1 | 6/2010 |
| EA | 201101239 | A1 | 2/2012 |
| EP | 2442371 | A1 | 4/2012 |
| EP | 2600078 | A2 | 6/2013 |
| JP | H0762802 | A | 3/1995 |
| JP | H10102708 | A | 4/1998 |
| JP | 2001055815 | A | 2/2001 |
| JP | 2001332756 | A | 11/2001 |
| JP | 2004132123 | A | 4/2004 |
| JP | 2011503846 | A | 1/2011 |
| JP | 2011520267 | A | 7/2011 |
| JP | 2013030678 | A | 2/2013 |
| RU | 2296739 | C2 | 4/2007 |
| RU | 2313642 | C1 | 12/2007 |
| WO | 2008000101 | A1 | 1/2008 |
| WO | WO2008000101 | A1 | 1/2008 |
| WO | 2009059028 | A2 | 5/2009 |
| WO | 2009090347 | A2 | 7/2009 |
| WO | WO-2009090347 | A2 * | 7/2009 ............ H02S 20/23 |
| WO | WO2009090347 | A2 | 7/2009 |
| WO | 2009114766 | A2 | 9/2009 |
| WO | 2010092052 | A2 | 8/2010 |

\* cited by examiner

ELECTRICAL CONNECTION DEVICE FOR A PHOTOVOLTAIC SYSTEM

This invention relates to an electrical junction box for an exterior building cladding panel that supports at least one photovoltaic module. A panel of this type is designed principally for the construction of photovoltaic roofs, although it is not limited to that application.

BACKGROUND

It is known that roof coverings with corrugated panels can be manufactured, for example from pre-coated galvanized steel, the edges of which overlap to ensure the watertightness of the roof.

It is also known, in particular from W02009090347, that photovoltaic modules can be pieced together to cover the building with photovoltaic modules. These can in particular be modules in the form of flexible strips attached with adhesive to the surface of the troughs of the corrugated panel. In the future, they may also be photovoltaic devices installed directly on the surface of the troughs of the corrugated panel, in particular by vacuum deposition processes or deposition at atmospheric pressure. These modules are connected to one another by a network of cables, the majority of which are preferably located on the rear surface of the cladding to avoid the premature deterioration of the cables and to preserve the aesthetic appearance of the building.

However, an arrangement of this type has the disadvantage that it requires access to the underlayment to make the connection, on the back side of the corrugated panels, of two successive modules.

It is known from JP10102708 that the use of cables can be avoided by resorting, on one hand, to a male electrical connector located in the vicinity of the lower extremity of the panel and on the reverse side, and on the other hand a female electrical connector located in the vicinity of the upper extremity of the panel and on the upper surface. During the assembly of two longitudinally adjacent roof panels, the male electrical connector of the upper panel is inserted into the female electrical connector of the lower panel, which electrically connects the photovoltaic module of the upper panel to the photovoltaic module of the lower panel.

However, an arrangement of this type does not make it possible to adapt the wiring plan of the photovoltaic installation in case of roofing features such as, for example, a chimney output, a ventilation shaft, a garret window, a skylight or an access door. Resorting to electric cables to bypass the features in the roof is incompatible with the male and female electrical connectors.

SUMMARY OF THE INVENTION

An object of the present invention is to resolve the above mentioned problems by proposing an electrical junction box that facilitates the assembly of panels and the wiring of the photovoltaic modules.

The present invention provides an electrical junction box for building exterior cladding panel supporting at least one photovoltaic module comprising an electrical pole on one of its longitudinal extremities and one electrical pole of reverse polarity on the other extremity, the junction box comprising:
- a base,
- a lateral wall surrounding the base and extending perpendicular to it, the lateral wall comprising, on its external face, a peripheral shoulder intended to hold the box in place in an opening made on the exterior cladding panel,
- an access door located on the part of the junction box located below the peripheral shoulder, intended for the insertion of a circuit breaker in the junction box,
- a cable outlet situated in the part of the junction box located above the peripheral shoulder, intended to connect the electrical junction box to an electrical pole of the photovoltaic module supported by the panel,
- an internal cavity, delimited by the base and the wall, comprising
    - an electrical terminal with an axis perpendicular to the base, intended for the connection of an electrical plug located on the reverse side of an adjacent exterior cladding panel,
    - an electrical switch connecting the electrical terminal to the cable outlet and located facing the access door.

The box according to the invention can also have the following optional characteristics, considered individually or in combination:
- the peripheral shoulder is located in the upper third of the lateral wall,
- the peripheral shoulder is continuous over the periphery of the lateral wall,
- the access door is delimited by an area that is thinner than the lateral wall or the base,
- the cable outlet is adjacent to the peripheral shoulder,
- the cable outlet is in the form of an electrical terminal that can be connected to an electrical plug,
- the electrical switch is a switch with mechanically actuated flexible blades comprising two contact blades in contact with each other by default and which can be separated from each other by a mechanical action.

The present invention further provides a building exterior cladding panel comprising:
- an upper transverse edge comprising an upper overlap area intended to be covered by an adjacent panel,
- a lower transverse edge comprising a lower overlap area intended to overlap an adjacent panel,
- a central part connecting the transverse edges, covered by at least one photovoltaic module comprising an electrical pole on one of its longitudinal extremities and an electrical pole of reverse polarity on the other extremity,
- a perforation located in the lower overlap area and traversed by an electrical cable connecting one of the two electrical poles of the photovoltaic module to an electrical plug located on the reverse side of the panel in the lower overlap area,
- an opening located in the upper overlap area, into which is inserted an electrical junction box connected to the other electrical pole of the photovoltaic module by means of an electrical cable, the junction box comprising:
    - a base,
    - a lateral wall surrounding the base and extending perpendicular to it, the lateral wall comprising, on its external surface, a peripheral shoulder to hold the box in place in the opening,
    - an access door located on the part of the junction box located below the peripheral shoulder, intended for the insertion of a circuit breaker in the junction box
    - a cable outlet, situated in the part of the junction box located above the peripheral shoulder to connect the electrical junction box to the other electrical pole of the photovoltaic module, an internal cavity, delimited by the base and the wall, comprising
- an electrical terminal with an axis perpendicular to the base, intended for the connection of an electrical plug located on the reverse side of an adjacent exterior cladding panel,
- an electrical switch connecting the electrical terminal to the cable outlet and located facing the access door.

The panel according to the invention can also have the optional characteristic according to which it comprises a recess surrounding the opening.

The present invention further provides an electrical connection assembly comprising an electrical junction box according to the invention and a circuit breaker comprising:
- a central body making it possible to grasp the circuit breaker,
- a blade extending the central body on one side and carrying on its surfaces, respectively the lower and upper, two electrical contactors,
- two electrical sockets extending the central body on the other side, each electrical socket being connected to an electrical contactor.

Other characteristics and advantages of the invention will become apparent from reading the following description.

BRIEF DESCRIPTION OF THE DRAWINGS

To illustrate the invention, tests have been conducted and will be described by way of non-restricting examples, in particular with reference to the accompanying figures which show.

The invention will be better understood by reading the following description, given by way of a non-restricting example, with reference to the accompanying figures which show.

In the figures, the same reference numbers identify the same components.

DETAILED DESCRIPTION

Throughout the text, a panel is defined as a component with a flat shape, i.e. with a low thickness compared to its other dimensions. The panel can be in the form of a plate or sheet constituted by a single material or a composite assembly. In the latter case, the panel consists of a stack of a plurality of layers of the same material or different materials. The material in question can be, among other things, a metal material, a polymer or even a ceramic. By way of non-restricting examples, reference can be made to metal materials such as steel, aluminum, copper and zinc. The panel is preferably a metal plate. It is preferably galvanized steel pre-coated to protect it against corrosion. The panel can optionally be foamed on the interior surface and thereby constitute the exterior cladding of a sandwich panel.

In the context of the invention, the panel will preferably have been previously formed by means of any known forming process, among which reference can be made by way of non-restricting examples to bending, shaping, stamping and molding.

To form an exterior building cladding, such as a roof or a façade, the panels are assembled by marginal overlapping of their longitudinal edges and their transverse edges and are fastened to the load-bearing structure of the building by fastening means such as bolts, nails or even rivets.

In the remainder of the description, to facilitate an understanding of the invention, reference will be made only to a roof, although the invention can also be used for any exterior building cladding.

Throughout the text, "photovoltaic module" means an assembly of photovoltaic cells connected to one another, preferably in series, and insulated from the outside by a protective barrier. By way of non-restricting example, such photovoltaic modules can be in the form of flexible strip glued to the central part of the panel or a module constructed directly on the central part of the panel by successive deposition of layers of appropriate types by vacuum or atmospheric pressure deposition processes.

Within each photovoltaic module, the arrangement and the organization of the photovoltaic cells are not restrictive. By way of a non-restricting example, the cells can be arranged one underneath the other in a single row or can be arranged in a plurality of rows, the rows being connected to one another to form a sort of folded strip. Preferably, and to facilitate the manufacture of photovoltaic modules directly on the panel by vacuum deposition processes or deposition at atmospheric pressure, the cells are arranged in a single row.

In the context of the invention, the photovoltaic module comprises an electrical pole on one of its longitudinal extremities and an electrical pole of reverse polarity on the other extremity.

Figure 1:
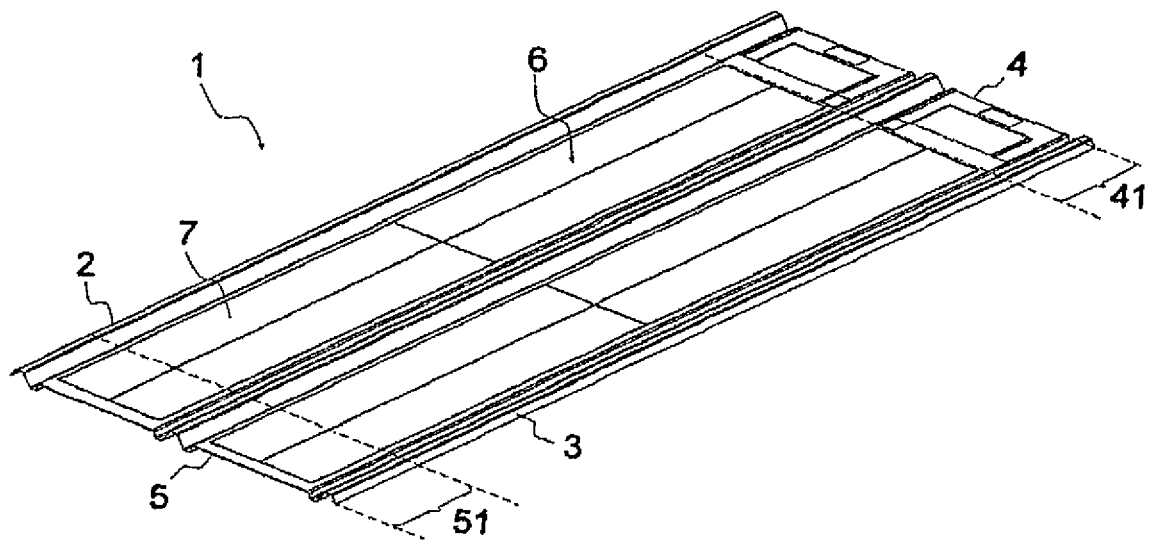
FIG. 1 is a view in perspective of an exterior building cladding panel supporting at least one photovoltaic module.

With reference to FIG. 1, the panel 1 of the exterior building cladding is constituted principally by a first longitudinal edge 2, a second longitudinal edge 3, an upper transverse edge 4 and a lower transverse edge 5, and the four edges are connected by a central part 6 covered by at least one photovoltaic module 7.

The upper transverse edge 4 comprises an upper overlap area 41 intended to be covered by an adjacent panel during the assembly of the roof. This upper overlap area generally has a width between 150 and 500 mm, depending on the pitch of the roof, among other things.

The lower transverse edge 5 comprises a lower overlap area 51 intended to cover an adjacent panel during the assembly of the roof. This lower overlap area generally has a width between 150 and 500 mm depending on the pitch of the roof, among other things.

Figure 2:
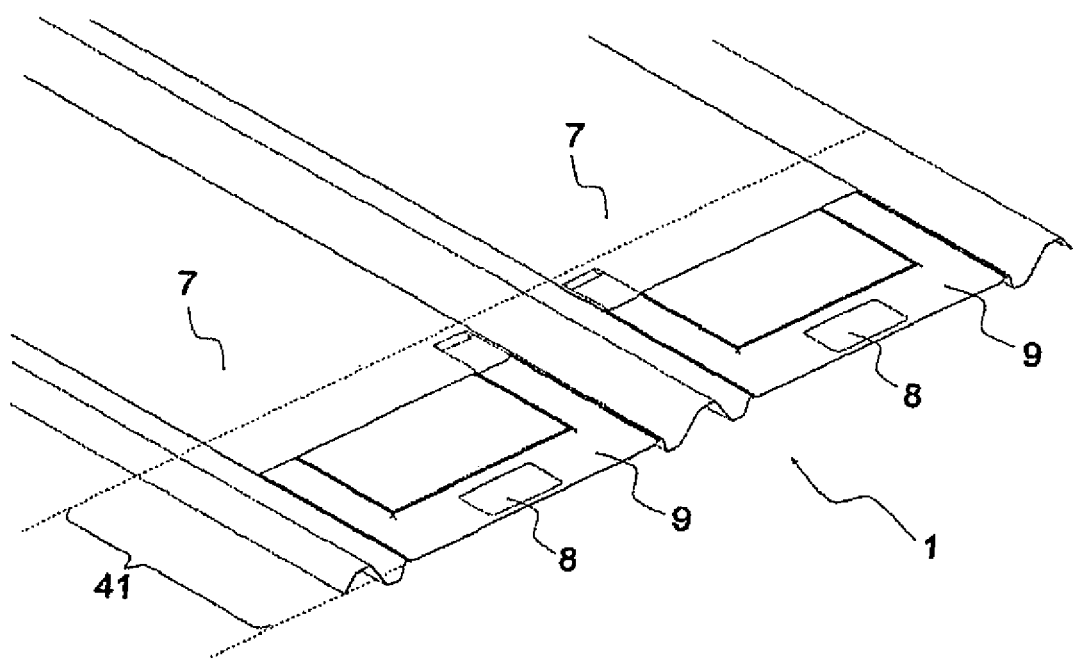
FIG. 2 is a view in perspective of the upper part of the panel illustrated in FIG. 1.

With reference to FIG. 2, the upper overlap area 41 of the panel 1 comprises an opening 8 intended for the insertion of an electrical junction box. The dimensions of the opening are adapted to the electrical junction box provided for this purpose. In particular, the dimensions are adapted taking into consideration thermal expansion and the loads that can be exerted on the panel during use.

The opening 8 can be obtained by any cutting technique known to a person skilled in the art, including among others, to cite non-restrictive examples, punching, milling, mechanical cutting, laser cutting, water cutting or oxyacetylene cutting.

Preferably, the upper overlap area 41 of the panel 1 also comprises a recess 9 surrounding the opening 8. This recess makes it possible to set the junction box lower compared to the perimeter of the recess and to integrate the electrical cables that connect the junction box to the photovoltaic module 7. By adapting the respective dimensions of the recess, of the junction box and of the electrical cables, it is thereby possible to create a joint that covers the upper overlap area 41 by the lower overlap area 51 of an adjacent panel. This arrangement is advantageous in terms of creating a watertight seal in the assembly of two adjacent panels.

The recess 9 can be obtained by stamping of the panel or by any other forming technique known to a person skilled in the art and appropriate to the situation.

Figure 3:
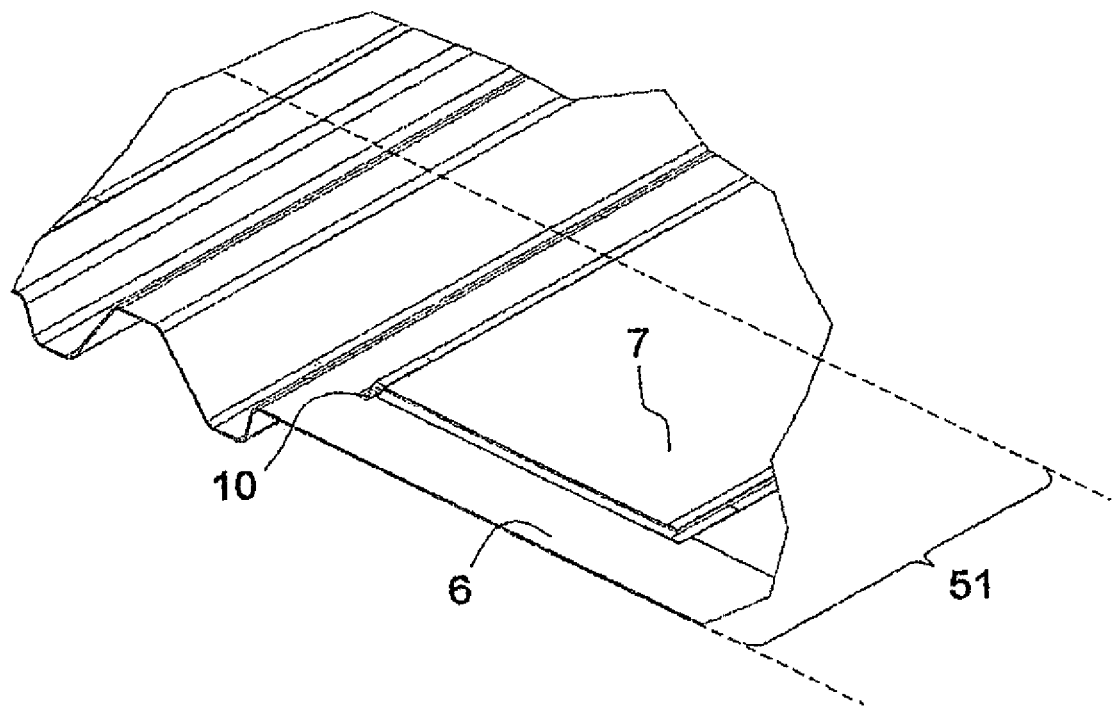
FIG. 3 is a view in perspective of the lower part of the panel illustrated in FIG. 1.

With reference to FIG. 3, the lower overlap area 51 comprises a perforation 10, i.e. an opening made on the thickness of the panel. The perforation 10 makes it possible to pass, on the rear surface of the panel an electrical cable connected to the photovoltaic module 7.

The perforation 10 can be obtained by any cutting technique known to a person skilled in the art including, by way of nonrestrictive examples, punching, milling, mechanical cutting, laser cutting, water cutting or oxyacetylene cutting.

Figure 4:
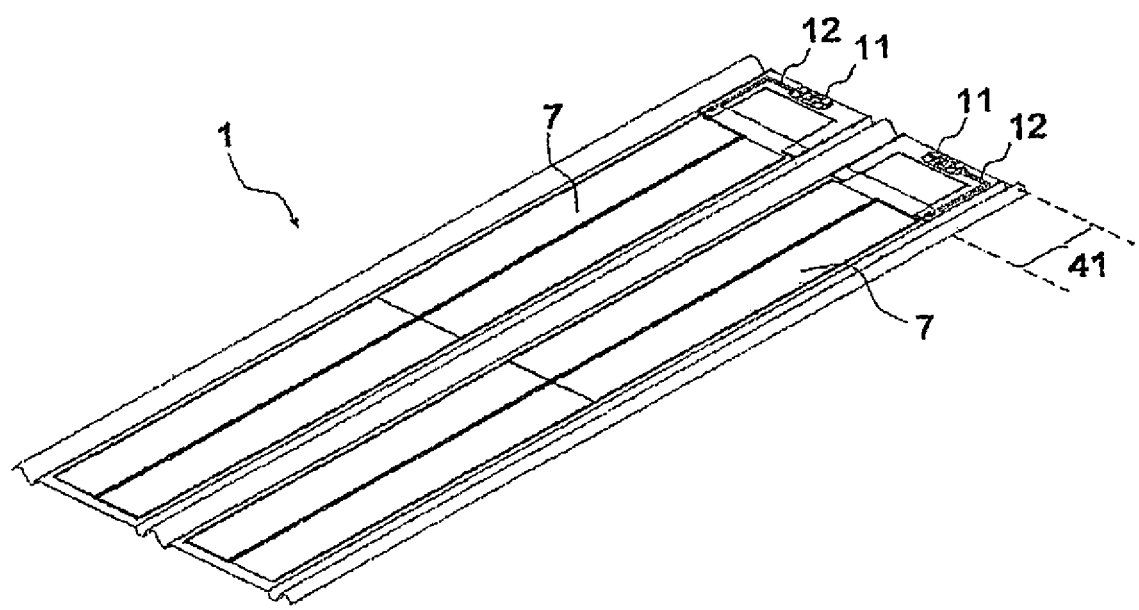
FIG. 4 is a view in perspective of an exterior building cladding panel supporting at least one photovoltaic module.

With reference to FIG. 4, the panel 1 also comprises a junction box 11 inserted into the opening 8 made in the panel 1 in the upper overlap area 41. The junction box 11 is connected to the photovoltaic module 7, and in particular to its electrical pole located on its upper extremity, by means of an electrical cable 12.

Figure 5:
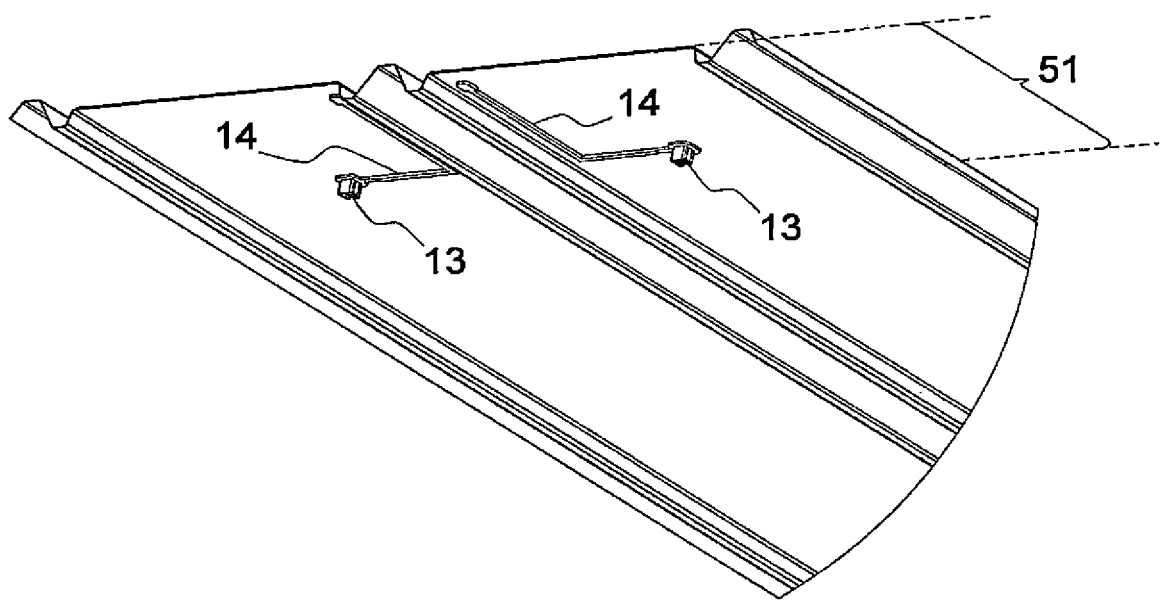
FIG. 5 is a view in perspective of the reverse side of the lower part of the panel illustrated in FIG. 4.

With reference to FIG. 5, the panel 1 also comprises an electrical plug 13 located on the reverse side of the panel in the lower overlap area 51. The electrical plug 13 is connected to the photovoltaic module 7 and in particular to its electrical pole located on its lower extremity, by means of electrical cable 14. The electrical cable 14 traverses the panel 1 at the level of the perforation 10.

The electrical plug 13 is intended to be connected to the junction box of an adjacent panel 1, when the lower overlap area 51 of the panel supporting the electrical plug covers the upper overlap area 41 of the adjacent panel. In this manner, the photovoltaic modules supported by these two panels are electrically connected.

Figure 6:
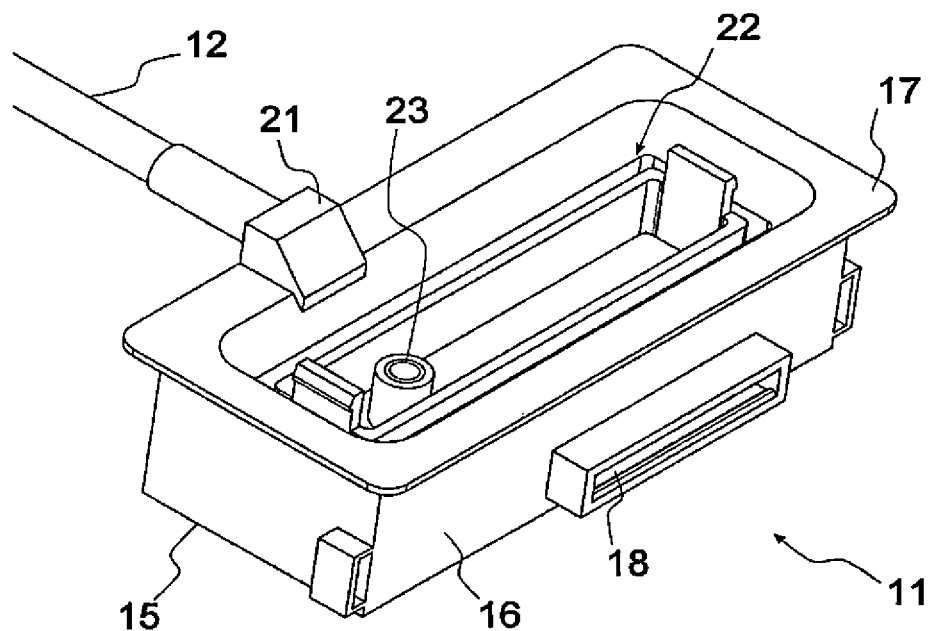
FIG. 6 is a view in perspective of an electrical junction box in a first embodiment.

With reference to FIG. 6, the junction box 11 is described in a first embodiment.

First of all, the junction box comprises a base 15 bordered by a lateral wall 16 which rises perpendicular to the base.

Preferably, the base 15 contains no opening in order to facilitate the proper water tightness of the junction box.

Preferably, the base 15 is flat to minimize the space occupied by the junction box and to allow its proper insertion at the level of the overlapping area between two adjacent exterior cladding panels.

In the illustrated embodiment, the lateral wall 16 has a rectangular section and is thus formed by four lateral side walls. In the framework of the invention, however, other wall sections are also possible.

The base and the lateral wall are preferably made of insulating material, for example by molding of a synthetic material, in particular plastic.

The lateral wall 16 comprises a peripheral shoulder 17 on its external face.

The peripheral shoulder 17 makes it possible to support the junction box against the exterior cladding panel when the box, and in particular the lateral wall, is inserted into the opening 8 made in the exterior cladding panel.

Preferably, the peripheral shoulder 17 is constituted by a bulge made of the same material as the lateral wall of the junction box. The shoulder can also be fabricated at the same time as the lateral wall, for example by molding.

The peripheral shoulder 17 is preferably located in the upper third of the lateral wall, and most preferably at the level of the upper edge of the lateral wall, so that the junction box projects as little as possible beyond the upper surface of the exterior cladding panel. A configuration of this type makes it possible to ensure a proper overlapping of two longitudinally adjacent exterior cladding panels.

The peripheral shoulder 17 is preferably continuous over the periphery of the lateral wall. This makes it possible to facilitate the realization of a waterproof seal between the junction box and the exterior cladding panel. However, it is possible to provide a discontinuous peripheral shoulder if a good seal is not necessary at this level.

For the same reasons of waterproofing, it is possible to provide a seal on the lower surface of the peripheral shoulder. This seal will be squeezed between the junction box and the panel when the box is installed in the panel. This seal can be constituted by an adhesive that connects the junction box to the exterior cladding panel.

The junction box 11 further comprises an access door 18 located in the lateral wall of the junction box. The access door is defined by a portion of the lateral wall that can be removed from the rest of the lateral wall.

In one embodiment of the invention, the access door 18 is delimited by an area that is thinner than the lateral wall. It is then easy for an operator to use a cutter to cut the thinner area and thereby gain access to the interior of the junction box.

In another embodiment of the invention, the access door 18 is a cover that is held in place by screws. It is then easy for an operator to unscrew the screws, remove the cover and thereby gain access to the interior of the junction box.

The access door 18 is located on the lateral wall of the junction box, preferably on the lateral side wall intended to be oriented toward the upper transverse edge 4 of the panel. It is thereby easy to access when the junction box is inserted into the panel 1, which is itself installed on the roof. Consequently, the operator does not need to have access to the underlayment to access the access door. All that is required to access the access door is to have access to the upper transverse edge 4 of the panel 1.

Depending on the depth of the recess 9 and/or the position of the peripheral shoulder 17, the access door can be located above or below the peripheral shoulder.

Figure 7:
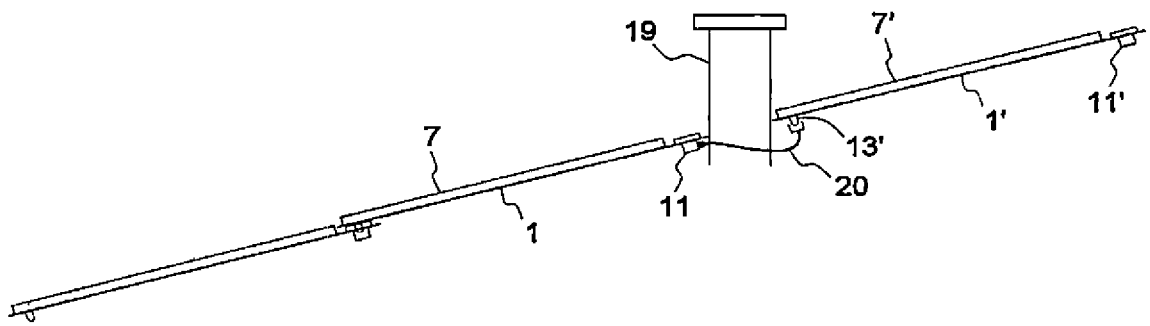
FIG. 7 is a schematic sectional view of a roof comprising two exterior cladding panels supporting at least one photovoltaic module.

This access door makes it possible to adapt the wiring plan of the photovoltaic installation as a function of the roof features. As illustrated in FIG. 7, in case of a roof feature such as a chimney shaft 19, the photovoltaic module 7 supported by the panel 1 adjacent to the roof features cannot be electrically connected to the panel 1' located on the other side of the roof feature simply by plugging the electrical plug 13' of the panel 1' into the junction box 11 of the panel 1. Thanks to the access door of the junction box 11, it is then possible to electrically connect one extremity of an electrical cable 20 to the junction box of the panel 1 adjacent to the roof feature. The other extremity of the electrical cable 20 is connected to the electrical plug 13' of the panel 1' located on the other side of the roof feature.

The details of the electrical connection of the electrical cable 20 to the junction box 8 are described below.

Given the position of the access door 18, the electrical cable 20 used is located on the underside of the panels 1. This makes it possible to prevent premature deterioration of the cable and to preserve the aesthetics of the building.

With reference to FIG. 6, the junction box also comprises a cable outlet 21 located in the part of the junction box that is above the peripheral shoulder 17, in other words in the part of the box that is accessible from the upper surface of the panel 1 once the junction box 11 is inserted into the opening 8 of the panel.

This cable outlet 21 makes it possible to connect the upper electrical pole of the photovoltaic module to the junction box via the electrical cable 12.

The fact that the cable outlet 21 is located in the part of the junction box that is above the peripheral shoulder 17 makes it possible to prevent having to perforate the panel to make possible the passage of the electrical cable 12.

In one embodiment of the invention, the cable outlet 21 is adjacent to the peripheral shoulder. This arrangement allows the electrical cable to be flush with the panel 1. The cable can also be glued to the panel and its small size facilitates the overlapping of the panel by an adjacent panel.

In one embodiment of the invention, the cable outlet 21 is in the form of an electrical terminal that can be connected to an electrical plug located on the extremity of the electrical cable 12 intended to connect the upper electrical pole of the photovoltaic module 7 to the junction box 11. The electrical terminal can be a male terminal or a female terminal. The type of electrical plug of the electrical cable 12 will simply be adjusted as appropriate.

Figure 8:
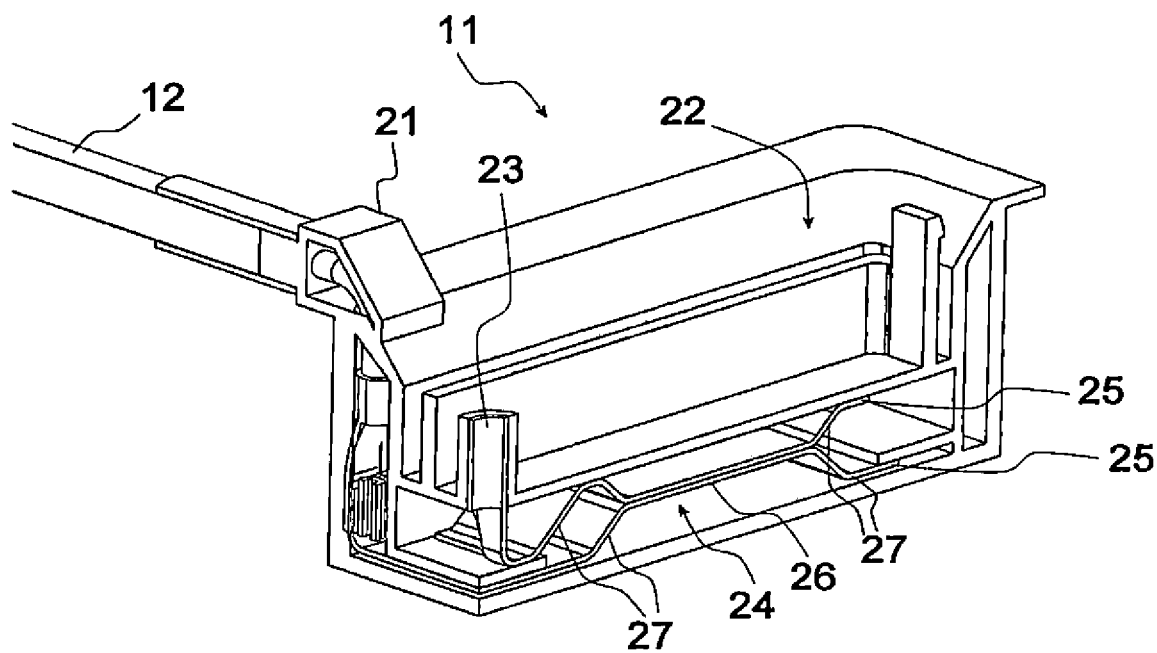
FIG. 8 is a cutaway view of an electrical junction box.

Alternatively, the cable outlet 21 makes possible the passage of an electrical cable directly connected to the interior of the connection box, as illustrated in FIG. 8.

With reference to FIG. 6, the base 15 and the lateral wall 16 define an interior cavity 22.

The interior cavity 22 comprises first of all an electrical terminal 23 with an axis perpendicular to the base.

The electrical terminal 23 makes it possible to electrically connect the junction box of a first panel 1 to the electrical plug 13 of a second panel 1 during the assembly of two adjacent panels. In particular, when the lower overlap area 51 of the upper panel is placed on the upper overlap area 41 of the lower panel, by a translation movement perpendicular to the plane of the panels, the electrical terminal 23 of the junction box of the lower panel and the electrical plug 13 of the upper panel are fitted together.

The electrical terminal 23 may be a male terminal or a female terminal. The type of electrical plug 13 will simply be adapted as appropriate.

The person skilled in the art will know how to adjust the geometry and respective dimensions of the electrical terminal 23 and of the electrical plug 13 to ensure a good electrical connection and good waterproofing after the electrical terminal 23 and the electrical plug 13 are fitted together.

With reference to FIG. 8, the interior cavity 22 of the junction box 11 also comprises an electrical switch 24 that connects the electrical terminal 23 to the cable outlet 21.

The electrical switch 24 makes it possible to open the electrical circuit between the electrical terminal 23 and the cable outlet 21. In the event of the opening of the electrical circuit, the electrical connection between two photovoltaic modules 7 supported by two adjacent panels 1 is no longer possible. On the other hand, it is then possible to electrically connect photovoltaic modules supported by distant panels via the electrical cable 20 as illustrated in FIG. 7.

In the illustrated embodiment, the electrical switch 24 is in the form of a switch with mechanically actuated flexible contactors. It comprises two contact blades 25 which are in contact with each other by default and which can be separated from each other by a mechanical action, e.g. by the insertion of a circuit breaker. The first contact blade is electrically connected to the electrical terminal 23. The second contact blade is electrically connected to the cable outlet 21.

Each contact blade comprises a central part 26 capable of making electrical contact with the central part of the other contact blade. The central part is preferably flat to promote good electrical contact.

Each central part 26 is extended on either side by flexible legs 27, the flexibility of which allows the displacement of the central part 26 when the circuit breaker is inserted.

The electrical switch 24 is located facing the access door 18. When the latter is opened, it is then possible to insert a circuit breaker 28 in the junction box as illustrated in FIGS. 9 and 10.

Figure 9:
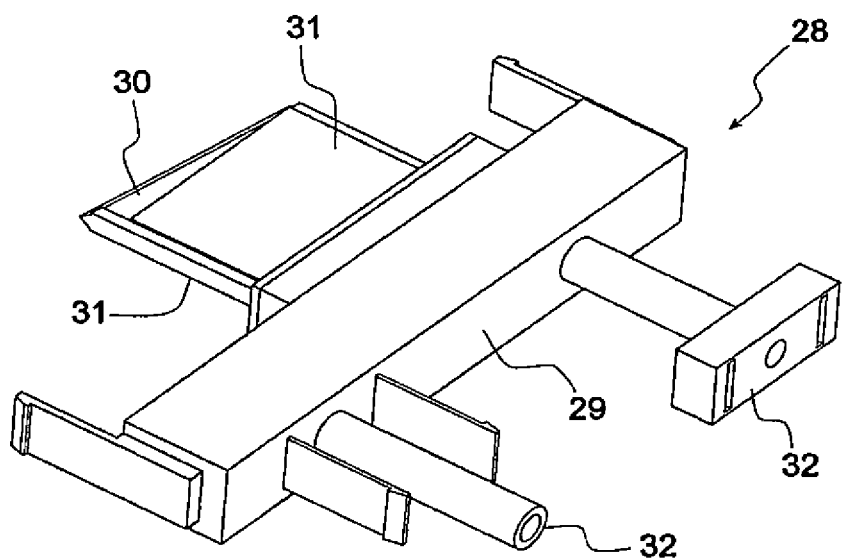
FIG. 9 is a view in perspective of a circuit breaker.

As illustrated in FIG. 9, the circuit breaker 28 comprises:
a central body 29 that allows the circuit breaker to be grasped.
a blade 30 that extends the central body on one side and has two electrical contactors 31 on its respective upper and lower surfaces,
two electrical sockets 32 that extend the central body on the other side.

Each of the electrical contactors 31 is connected to an electrical socket 32.

Figure 10:
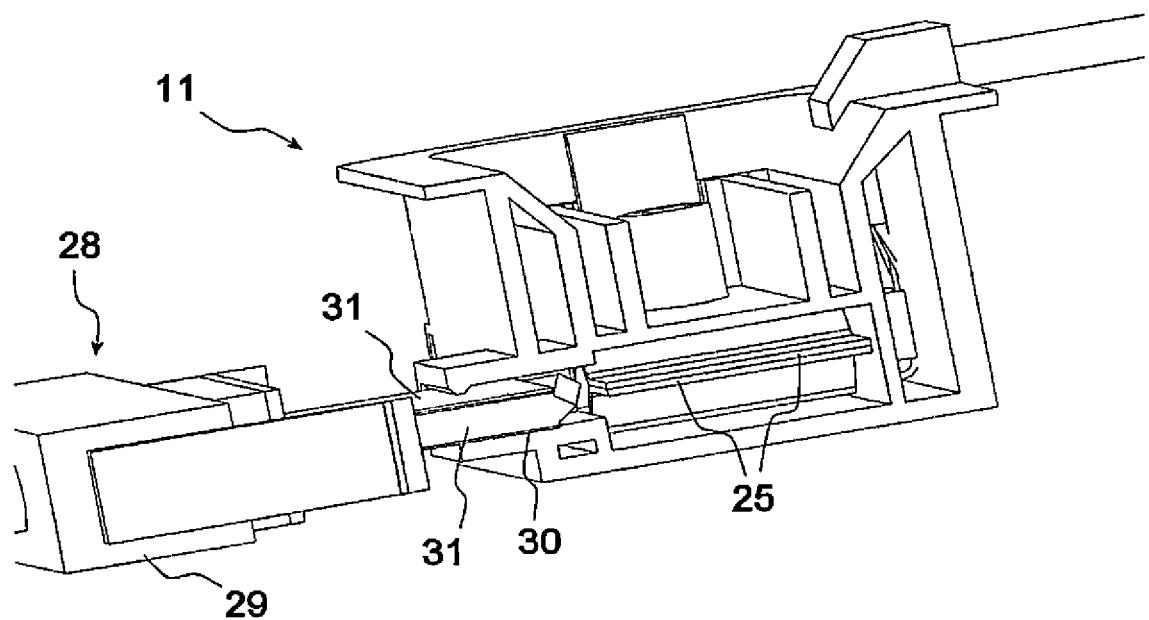
FIG. 10 is a cutaway view of an electrical junction box in combination with a circuit breaker.

As illustrated in FIG. 10, when the circuit breaker 27 is inserted into the junction box, at the level of the access door, the blade of the circuit breaker separates the two contact blades 25 of the electrical switch of the junction box. The upper electrical contactor 31 is then once again in electrical contact with the upper contact blade 25. In this manner the electrical terminal 23 is in electrical contact with one of the two electrical sockets 32. The lower electrical contactor 31, for its part, is once again in electrical contact with the lower contact blade 25. In this manner the cable outlet 21 is electrically connected with the second electrical socket 32.

Thanks to this circuit breaker associated with the electrical switch, an electrical cable 20, as illustrated in FIG. 7, can be connected to the second electrical socket 32 to electrically connect the rest of the installation to the photovoltaic module 7 located on the panel 1 and connected to the cable outlet 21.

Preferably, when the electrical switch 24 is in the form of a switch with mechanically actuated flexible blades, each of the contactors 31 has a shape similar to the central part 26 of the contact blades to allow good electrical contact between a contact blade 25 and a contactor 31 when the circuit breaker 28 is inserted into the junction box 11.

As an alternative to the insertion of a circuit breaker, the access door 18 and the electrical switch 24 make it possible to connect to the junction box other electronic devices that will permit additional functions to be incorporated into the junction box. These can be, by way of non-restricting examples, an electronic control unit, a micro-converter etc.

Figure 11:
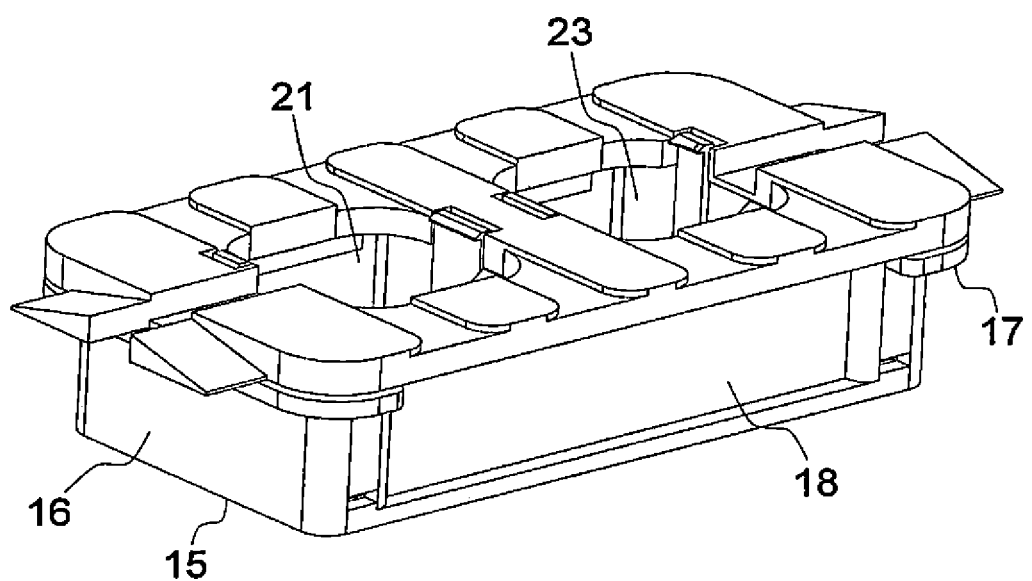
FIG. 11 is a view in perspective of an electrical junction box in a second embodiment.

With reference to FIG. 11, a second embodiment of the junction box 11 is described below.

In this second embodiment, the junction box 11 comprises all of the characteristics of the junction box according to the first embodiment, with the exception of the characteristics described below.

The cable outlet 21 is in the form of an electrical terminal with an axis perpendicular to the base and located in the interior cavity 22. This arrangement easily allows to connect, from the upper side of the panel 1, an electrical plug located on the extremity of the electrical cable 12 (not shown in the figure) intended to connect the upper electrical pole of the photovoltaic module 7 to the junction box 11.

The interior cavity 22 is partly closed by a cover 33 that closes the cavity with the exception of the upper extremities of the electrical terminal 23 and the cable outlet 21.

What is claimed is:

1. A building exterior cladding panel comprising:
   a panel having a first longitudinally extending edge, a second longitudinal extending edge, an upper transverse edge and a lower transverse edge, the upper transverse edge extending from the first longitudinally extending edge to the second longitudinally extending edge, the lower transverse edge extending from the first longitudinally extending edge to the second longitudinally extending edge, the panel having a longitudinal dimension and a transverse dimension, the transverse dimension delimited by the first and second longitudinal edges and the longitudinal dimension delimited by the upper and lower transverse edges;
   the upper transverse edge of the panel including an upper overlap area intended to be covered by an adjacent panel;
   the lower transverse edge of the panel including a lower overlap area intended to overlap a further adjacent panel;
   a central part of the panel connecting the upper and lower transverse edges, covered by at least one photovoltaic module including an electrical pole on a longitudinal end of the at least one photovoltaic module and a further electrical pole of reverse polarity on an opposite longitudinal end of the at least one photovoltaic module;
   a perforation located in the lower overlap area and traversed on one side of the panel by an electrical cable connecting one of the two electrical poles of the photovoltaic module to an electrical plug located on a reverse side of the panel in the lower overlap area;
   an opening located in the upper overlap area, into which is inserted an electrical junction box connected to the other of the two electrical poles of the photovoltaic module by an electrical cable, the electrical junction box comprising:
      a base;
      a lateral wall surrounding and extending perpendicular to the base, the lateral wall including, on an external surface, a peripheral shoulder, the lateral wall passing through the opening, the peripheral shoulder holding the electrical junction box in place in the opening;
      an access door located on the lateral wall of the electrical junction box, intended for the insertion of a circuit breaker in the electrical junction box;
      a cable outlet, situated in a part of the electrical junction box located above the peripheral shoulder, to connect the electrical junction box to the other of the two electrical poles of the photovoltaic module;
      an internal cavity delimited by the base and the lateral wall, including:
         an electrical terminal with an axis perpendicular to the base, intended for connection of an electrical plug located on a reverse side of said adjacent panel; and
         an electrical switch connecting the electrical terminal to the cable outlet and located facing the access door.

2. The building exterior cladding panel as recited in claim 1,
   further comprising:
   a recess surrounding the opening.

3. The building exterior cladding panel of claim 1, wherein the longitudinal dimension is greater than the transverse dimension.

4. The building exterior cladding panel of claim 1, wherein the perforation is adjacent the at least one photovoltaic module.

5. The building exterior cladding panel of claim 1, wherein the at least one longitudinally extending photovoltaic module covers the central part and a portion of the lower overlap area.

6. The building exterior cladding panel of claim 1, wherein the at least one longitudinally extending photovoltaic module is longitudinally adjacent the upper overlap area.

7. The building exterior cladding panel of claim 1, wherein the opening is spaced apart from the at least one photovoltaic module in the longitudinal direction.

8. The building exterior cladding panel of claim 1, wherein the base forms a bottom surface of the electrical junction box, the lateral wall extends from the base upward to the external surface, and where the peripheral shoulder forms a top surface of the junction box.

9. The building exterior cladding panel of claim 1, wherein the at least one photovoltaic module is at least one longitudinally extending photovoltaic module, and the at least one longitudinally extending photovoltaic module, the first longitudinally extending edge, and the second longitudinally extending edge all longitudinally extend in a longitudinal direction.

10. The building exterior cladding panel of claim 9, wherein the longitudinal end and the opposite longitudinal end are at opposite ends of the at least one longitudinally extending photovoltaic module in the longitudinal direction.

11. The building exterior cladding panel of claim 9, wherein the adjacent panel is a longitudinally adjacent panel in the longitudinal direction and the further adjacent panel is a further longitudinally adjacent panel in the longitudinal direction.

12. The building exterior cladding panel of claim 1, wherein one of the electrical pole and the further electrical pole is in the upper overlap area and the other of the electrical pole and further electrical pole is in the lower overlap area.

* * * * *